United States Patent Office 3,376,357
Patented Apr. 2, 1968

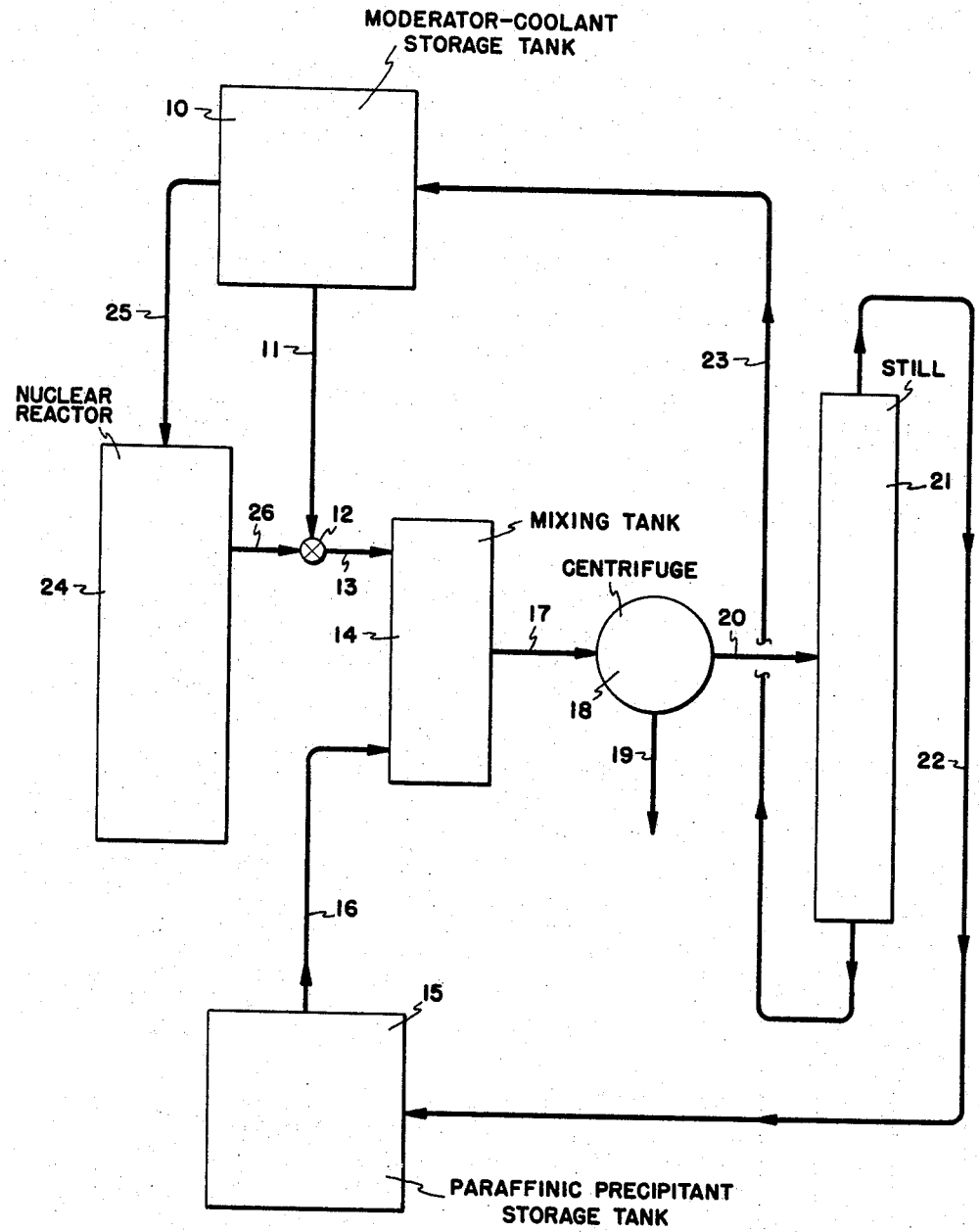

3,376,357
PURIFICATION AND RECLAMATION OF MODERATOR-COOLANTS
James F. Black, Convent Station, N.J., assignor, by mesne assignments, to the United States of America as represented by the United States Atomic Energy Commission
Continuation-in-part of application Ser. No. 124,189, July 14, 1961. This application Jan. 27, 1966, Ser. No. 532,497
5 Claims. (Cl. 260—674)

This application is a continuation-in-part of application Ser. No. 124,189, filed July 14, 1961, now abandoned.

This invention relates to removing contaminants from nuclear reactor coolants or moderator-coolants. In particular, the invention relates to a process for causing undesirable high-boiling polymer impurities in organic coolants to coagulate so that they may be easily removed therefrom.

Moderators are materials which are placed in a nuclear reactor to slow down newly born neutrons from their original high velocities. A coolant is generally a fluid substance which is used for cooling any part of a reactor in which heat is generated. It can also be used as a heat exchange medium. As used herein the term "coolant" includes coolants per se, as well as moderator coolants.

The feasibility of using hydrocarbon fluids as coolants for nuclear reactors has been demonstrated in the Organic Moderator Reactor Experiment (OMRE) currently being operated by Atomics International for the U.S. Atomic Energy Commission. The coolant used in this reactor is a synthesized mixture of polyphenyls comprising primarily isomers of terphenyls. On prolonged service within a nuclear reactor, degradation products, such as high-boiling polymers are formed within the moderator coolant as the result of chemical reactions induced by radiation and by the heat liberated during fission. A buildup of these degradation products within a reactor can cause surface fouling of the fuel elements. Such fouling can cause a local temperature rise which can accelerate the decomposition rate of a coolant which, in turn, can ultimately cause damage to the reactor. Severe damage could ultimately result in a shutdown of the reactor. Conventionally, these high-boiling polymers, known as high boilers, and other degradation products are periodically removed from the coolant by distillation and fresh coolant is added as makeup.

This invention resides in the discovery that the high boilers present in organic coolants as degradation products can be easily and conveniently removed by a process which obviates the necessity for distillation under vacuum. The removal of such impurities is accomplished by contacting the coolant containing colloidally dispersed high boilers with suitable paraffinic hydrocarbons capable of causing these impurities to coagulate and thus precipitate out from within the main body of the coolant. The paraffinic hydrocarbons used have a low surface tension and at elevated temperatures, preferably above 100° F., cause the colloidal impurities to coagulate in such large agglomerates that they can be removed by any conventional means such as filtration, centrifuging, settling, decanting, and the like. In brief, the invention contemplates purifying polynuclear aromatic hydrocarbon coolants by causing the formation of coagulated solid precipitates which are easily removed from the organic coolants maintained in a liquid phase under the purification conditions of elevated temperature and pressure.

The process of the invention may be readily understood by the attached drawing illustrating a preferred embodiment thereof.

Referring now to the attached drawing, coolant from storage tank 10 is flowed through line 25 into nuclear reactor 24, wherein decomposition of aromatic hydrocarbons occurs by radiolysis and pyrolysis causing formation of high boilers which become colloidally dispersed in the hot liquid coolant. To prevent excessive buildup of these high boilers, a side stream of used coolant to be purified is taken off from the nuclear reactor 24 through line 26, through valve 12, then through line 13 to mixing tank 14. Paraffinic precipitant from storage tank 15 is flowed through line 16 to mixing tank 14. The mixing of the used coolant with the precipitant causes the high boiler colloidal impurities to coagulate into agglomerates which tend to precipitate. The resulting slurry of said agglomerates in the liquid coolant is removed through line 17 from the mixing tank 14 to a centrifuge or separator 18. Solid agglomerate separated from the liquid coolant is removed from separator 18 through line 19. The remaining mixture of precipitant and liquid coolant is flowed through line 20 to still 21 where precipitant is flashed off and returned to storage tank 15 through line 22 for reuse in the process. Used coolant is returned to storage tank 10 by line 23. When desired, coolant containing impurities can be flowed from the bottom of storage tank 10 through line 11 to the three-way valve 12, thence by line 13 to mixing tank 14 for repurification by mixing therein with precipitant which coagulates high boilers.

The manner in which the deleterious polymeric high boilers are formed in aromatic hydrocarbon coolants, including the fused ring type aromatics and terphenyl type, by radiolytic and thermal decomposition is described in Atomic Energy Commission reports NAA–SR–6920 entitled "Coolant Decomposition Rates" and IDO–16907 entitled "Low Cost Organic Moderator-Coolants for Nuclear Reactors."

The high boilers which are the potential deposit formers in the aromatic coolant stream flowing through a nuclear reactor are present as a colloidal suspension of solid polymers that have high melting points. To a large extent these polymers are dispersed in benzene at temperatures above the normal boiling temperature of benzene maintained in liquid phase under pressure. The liquid paraffin hydrocarbons definitely act as coagulants of the high-boiling polymers having molecular weights above 230 as shown by data on precipitation of these polymers from benzene solution.

TABLE I.—PRECIPITATION OF HIGH BOILERS FROM BENZENE SOLUTION TERPHENYL MIXTURE CONTAINING HIGH BOILERS

| Percent Hexane Precipitant Added to Solution | Percent Higher Boilers Precipitated | Average Molecular Weight of Precipitated High Boilers |
|---|---|---|
| 10 | 6.5 | 1,300 |
| 30 | 11 | 1,200 |
| 70 | 42 | 1,000 |
| 90 | 52 | 880 |
| 100 | >52 | 750 |

In the experiments giving the foregoing data the precipitates were black solids. As more precipitant was added, more of the high boilers were precipitated.

The paraffin hydrocarbon acts as a coagulant rather than as a solvent or diluent as shown by the fact that under the coagulating conditions a sample of the high boilers in the amount of 25 g. and having an average molecular weight of 600 was dissolved in 1 cc. of benzene whereas only 1.69 g. of another 25 g. portion of said high boilers was dissolved in 1 cc. of hexane. The solute in the hexane was found to have a lower average molecular weight of 500.

The coagulating temperature can be controlled to control the amount of precipitation and molecular weight of the high boilers precipitated; therefore the temperature is raised to at least 100° F. but below the critical temperature of the paraffinic precipitant and the pressure is maintained high enough to prevent bubbling of the precipitant without substantial effect on the precipitation.

The high boilers have a complex composition of polycyclic aromatics, i.e., mostly above 5 cyclic rings per molecule, but they are different from straight-run or cracked asphalts in not containing resins and oils which have sulfur, nitrogen, and oxygen constituents. The asphalts have consistencies of sticky amorphous to plastic masses. The high boilers which are to be separated from the aromatic coolants are unlike asphalts in that they can be separated as powdery solids if they are prevented from being oxidized. Oxidation of these high boilers tends to occur in a vacuum distillation due to leakage of air into the still, and the oxidized high boilers then give handling difficulties, e.g., formation of tarry residue in the fuel elements.

The process of the invention is also applicable to those coolants which are prepared from an aromatic extract of a gas oil boiling range catalytic cycle stock which may be subjected to pyrolysis and/or visbreaking to improve its stability in a nuclear reactor.

The preferred precipitants used to cause the impurities to coagulate are $C_3$-$C_{12}$ paraffinic hydrocarbons. Hexane and heptane are particularly preferred. As specific examples of such materials which can be used, there are butane, pentane, hexane, heptane, octane, nonane, decane, dodecane and mixtures thereof. The preferred amount of precipitant to be employed at the deasphalting step is between about 2–10 volumes of precipitant per volume of coolant charged to the coagulating step. The temperature at which the coagulating step is conducted can be within the range of about 80 to 250° F. Preferably the mixture of precipitant with the aromatic hydrocarbon coolant is carried out under pressure, e.g., 2 to 20 atmospheres to maintain the paraffinic hydrocarbons in liquid state until the precipitate is formed and removed. Moreover, operating under such pressure enables the paraffinic precipitant to be easily flashed off at lowered pressure, e.g., at atmospheric pressure when separation from the coolant is desired.

The aromatic extract of catalytic cycle stock is particularly preferred as the coolant to be employed in the process of the invention. However, other suitable materials such as the various petroleum streams disclosed in Atomic Energy Commission report TID 6367 entitled "Petroleum Refinery Streams as Prospective Reactor Coolants: Thermal Stability Investigations," can be used. As used herein, catalytic cycle stock extracts are obtained from distillates boiling in the gas oil boiling range which are subjected to conventional catalytic cracking. Catalytic cycle stock is that portion of the gas oil which is uncracked. The catalytic cycle stock is then extracted by conventional solvent extraction processes such as phenol extraction, sulfur dioxide, furfural, nitrobenzene, and the like. The solvent extraction separates a paraffinic fraction and a highly aromatic extract. It is the highly aromatic extract which becomes subjected to radiolysis and pyrolysis in the nuclear reactor. The aromatic extract fraction of the catalytic cycle stock preferably boils within the range of about 500° F. to about 900° F. and comprises principally aromatic compounds. It is preferred, but not essential, that these aromatic extracts of catalytic cycle stocks be subjected to conventional desulfurization, such as hydrofining, to reduce the sulfur content of the extract, and/or a hydrodealkylation to lower the alkyl side chain content. Also, other materials such as terphenyls and the like can be used in the invention.

The suitable aromatic hydrocarbons obtainable from aromatic extracts of petroleum fractions produced by catalytic cracking when sufficiently refined are low in cost relative to terphenyl oils, which they resemble in boiling range, density, viscosity, tendency to solidify at moderate temperatures, and stability both radiolytic and thermal. They do not decompose appreciably at temperatures up to 750° F. They are mostly fused aromatic ring compounds that have no or few alkyl side chains, like phenanthrene, pyrene, fluorene, which have melting points substantially above 100° F., boiling and sublimation points above 500° F. under 1 atm. or below 1 atm. pressure, and molecular weights averaging from 180 to 260. When they undergo radiolytic and thermal decomposition at temperatures up to 750° F. for a period of 1 hour they generate a small amount of gas, and high boiling polymers which have higher molecular weights and higher melting points, and lower boiling hydrocarbons which are normally liquid and in the volatility range of benzene to diphenyl.

The low boiling hydrocarbons, i.e., with boiling points 176° F. to 500° F., become present typically in amounts of about 0.5 to 15 wt. percent of the total coolant in the nuclear reactor while the high boilers are maintained at a concentration below about 30 wt. percent in the circulating coolant at reactor operating temperatures of 500° to 750° F. and pressures ranging from 2 to 20 atms., with venting of gas and low boilers from the reactor and purifying a side stream of the circulating coolant to remove high boilers.

Suitable organic coolants for use in the present invention also include hydrocarbon fractions boiling within the range of about 550° to 800° F. Preferably this fraction should have a boiling range of at least 100° F., a pour point of less than about 80° F. and preferably containing not more than about 5 wt. percent of extraneous materials having neutron cross sections of more than 10 barns. These coolants preferably have viscosities of from 32 to 2,000 SUS, e.g., 50 to 1,000 SUS at 100° F. Suitable examples of coolant materials of this type include petroleum aromatic hydrocarbon fractions boiling in the gas oil range and higher, low sulfur content virgin gas oil fractions, desulfurized gas oil fractions of crude oils, gas oil boiling range cycle stocks obtainable by the catalytic cracking of petroleum hydrocarbons, aromatic extracts of such catalytic cycle stocks, heating oil boiling range fractions, and the like. These liquid fractions contain polycyclic aromatic hydrocarbons which become solid at temperatures above 80° F. and therefore should not be cooled much below 80° F. in subjecting the coolant to the treatment for precipitating out agglomerates.

Additives may also be incorporated in the improved coolants of the invention to beneficially influence their behavior either in storage or in service. Thus, materials can be added to improve radiation, oxidation, or corrosion resistance, to prevent the deposition of sludge or coke on fuel elements and heating exchanger surfaces, and to improve viscosity temperature characteristics.

With respect to such additive materials, it is an additional feature of the invention that conventional detergent type materials can be incorporated in the circulating coolant to reduce the rate at which deposits are laid down on the fuel element surfaces. This will permit the reactor to be operated at higher fuel element surface temperatures. Thus, greater steam cycle efficiency and high power density from the reactor core will result. The detergents to be used for such a purpose should be preferably nonionic detergents. Nonionic detergents will not be affected by the high ionization density due to the intense field of ionizing radiation within the core. If ionic detergents are employed, they are preferably of the type which will place a negative charge on the suspended "high boilers" in the coolant. Suitable nonionic detergents include polyethylene glycol alkylphenyl ethers, alkyl phenoxy polyoxyethylene ethanol; hydroxypolyoxyethylene ether of dodecyl phenol and the like. Suitable ionic detergents include tetradecyldimethylamine acetate; glyceryl monostearate; stearyl dimethylbenzyl ammonium chloride and the like.

In order to illustrate the technique of the invention for removing impurities from a degraded coolant, the following examples were carried out.

Example I

One hundred g. of a cycle stock extract were pyrolyzed for 24 hours at a temperature of 750° F. 600 g. of heptane were then added to the pyrolyzed cycle stock extract. Twenty-one and eight-tenths g. of insoluble red powder were formed by the heptane addition and separated by filtering the cycle stock/heptane mixture off under vacuum through a paper filter using a Buckner funnel. The filtrate was then distilled off at atmospheric pressure leaving 62.6 g. of a pyrolyzed cycle stock extract. This extract was further distilled under vacuum for purposes of analysis and the following breakdown over the distillation range was obtained.

|  | G. |
|---|---|
| Light ends | 0.7 |
| 140° C. @ 0.2 mm. mercury of pressure | 9.4 |
| 145–197° C. at 0.2 mm. mercury of pressure | 28.3 |
| 197–240° C. at 0.2 mm. mercury pressure | 12.6 |
| Residue | 8.3 |

Example II

One hundred g. of the identical pyrolyzed cycle stock extraction of Example I were subjected to distillation under the following conditions with the following results:

|  | G. |
|---|---|
| Up to 145° C. @ 0.2 mm. mercury pressure | 47 |
| 202° C. @ 0.5 mm. mercury pressure | 17.4 |
| 202–236° C. @ 5 mm. mercury pressure | 8.9 |
| 236–274° C. @ 5 mm. mercury pressure | 5.4 |
| Residue | 21 |

The above data show that the process of the invention separates impurities from a coolant equally as effectively as vacuum distillation procedures. The trend is for operating temperatures of nuclear reactors to gradually increase. As these temperatures increase it becomes increasingly difficult for a vacuum distillation procedure to effectively remove high-boiling constituents economically. The use of the technique of the invention obviates any need for distillation at low pressures. Thus, expensive and cumbersome apparatus is eliminated in favor of a system which is operated with simple, easily obtainable and easily constructed apparatus.

The aromatic extract of a catalytic cycle stock used above had the following specification.

TABLE II.—AROMATIC HYDROCARBON COOLANT

| Property: | Aromatic extract of cat. cycle stock |
|---|---|
| Gravity, °API | 0.2 |
| Viscosity, SSU: | |
| At 100° F | 423 |
| At 130° F | 143 |
| At 210° F | 44 |
| Conradson carbon, wt. percent | 1.70 |
| Pour point, ° F | --- |
| Aniline point, ° F | 72 |
| Average boiling point, ° F | 745 |
| ASTM distillation, ° F.: | |
| 10% off at | 681 |
| 50% off at | 736 |
| 90% off at | 827 |
| Composition: wt. percent: | |
| Paraffins | 3.0 |
| Noncondensed naphthenes | 2.6 |
| Condensed naphthenes | 5.7 |
| Aromatics | 73.0 |
| Aromatic sulfur compounds | 11.7 |
| Nonhydrocarbon fraction | 4.0 |

| Elementary analysis—percent by weight: | Aromatic extract of cat. cycle stock |
|---|---|
| Nitrogen | 2.41 |
| Sulfur | Nil |
| Silicon | Nil |
| Sodium | Nil |
| Magnesium | Nil |
| Calcium | Nil |
| Aluminum | Nil |
| Vanadium | Nil |
| Chromium | Nil |
| Iron | Nil |
| Nickel | Nil |

The coolant containing mainly terphenyls, polynuclear aromatic hydrocarbons having fused or condensed rings as in phenanthrene, pyrene, and fluorene is maintained at temperatures above 100° F. in being purified and recirculated to the zone where the coolant is subjected to nuclear radiation and heat in the nuclear reactor to prevent solidification of these aromatic hydrocarbons. The coagulation is effected with propane, propane mixed with ethane, or butane at temperatures in the range of 100° to 200° F. and can be effected at temperatures of 200° up to 500° F. with the higher paraffins used as precipitants. The paraffins can be flashed off at temperatures in the range of 100° to 500° F. even under superatmospheric pressures.

Various known devices can be used, such as pumps, heat exchangers, valves, and meters for controlling the flow, temperature, and pressure of the coolant circulated to and from the nuclear reactor. This work was performed under the terms of Contract No. MA–1814 between Esso Research and Engineering Company and the Maritime Administration.

What is claimed is:

1. A method of removing high-boiling polymers having molecular weights above 300 from a nuclear reactor coolant which is an aromatic hydrocarbon liquid that boils principally within the range of about 550° to 800° F. and contains polynuclear aromatic hydrocarbons having average molecular weights of 180 to 260, said polymers having been formed by radiolysis and pyrolysis of hydrocarbons in said liquid and being colloidally dispersed in said liquid, which comprises contacting said liquid containing the polymers with a $C_3$ to $C_{12}$ paraffinic hydrocarbon liquid admixed as a precipitant in an amount to cause said polymers to coagulate into solid agglomerates at temperatures above 100° F. under a pressure which maintains the paraffinic hydrocarbon in liquid phase, separating said solid agglomerates of the polymers from the resulting liquid mixture of aromatic hydrocarbons and precipitant at above 100° F., distilling of paraffinic precipitant from said aromatic hydrocarbon liquid which remains unvaporized to recover aromatic liquid freed of the high-boiling polymers for reuse as nuclear reactor coolant.

2. The method as defined in claim 1, wherein said high-boiling polymers are formed at temperatures of about 500° to 750° F. in the aromatic hydrocarbon liquid coolant under pressures of 2 to 20 atmospheres, and in which the paraffinic hydrocarbon precipitant is easily flashed off under lowered superatmospheric pressure at temperatures between 100° F. and 500° F. from the aromatic hydrocarbon liquid after said separation of coagulated high-boiling polymers therefrom.

3. The method as defined in claim 1, wherein the aromatic hydrocarbon liquid used as the nuclear reactor coolant contains mainly terphenyls as the polynuclear aromatic hydrocarbons.

4. The method as defined in claim 1, wherein the aromatic hydrocarbon liquid used as the nuclear reactor coolant contains mainly polynuclear aromatic hydrocarbons having fused rings as in phenanthrene, pyrene, and fluorene.

5. The method as defined in claim 1, wherein a side stream of the aromatic liquid coolant used in a zone where nuclear radiation and heat forms the high-boiling polymers is withdrawn from said zone for removing the polymers and is maintained at temperatures above 100° F. while said polymers are coagulated and separated and until the liquid coolant is returned to said zone to prevent solidification of polynuclear aromatic hydrocarbons having average molecular weights of 180 to 260 that are principal components of the coolant.

No references cited.

DELBERT E. GANTZ, *Primary Examiner.*

C. E. SPRESSER, *Assistant Examiner.*